United States Patent [19]

Riordan et al.

[11] Patent Number: 4,849,596
[45] Date of Patent: * Jul. 18, 1989

[54] ELECTRICAL TERMINALS, TERMINATING METHODS AND ASSEMBLIES

[75] Inventors: Edward D. Riordan, S. Somerville; Allan Warner, Clark, both of N.J.

[73] Assignee: Joyal Products, Inc., Linden, N.J.

[*] Notice: The portion of the term of this patent subsequent to Aug. 18, 2004 has been disclaimed.

[21] Appl. No.: 68,654

[22] Filed: Jun. 30, 1987

Related U.S. Application Data

[63] Continuation-in-part of Ser. No. 808,530, Dec. 13, 1985, Pat. No. 4,687,898.

[51] Int. Cl.[4] ............................................. B23K 11/10
[52] U.S. Cl. ................................. 219/56.22; 219/56.1
[58] Field of Search ................ 219/56.1, 56.22, 91.2, 219/118; 228/4.5; 339/278 T

[56] References Cited
U.S. PATENT DOCUMENTS

4,211,913  7/1980  Camardella ................ 219/56.22
4,558,200  12/1985  Weigand, Jr. ............... 219/56.22
4,687,898  8/1987  Riordan et al. .............. 219/56.1

Primary Examiner—E. A. Goldberg
Assistant Examiner—Lincoln Donovan
Attorney, Agent, or Firm—Lerner, David, Littenberg, Krumholz & Mentlik

[57] ABSTRACT

A terminal pin is provided with a widened connecting section defining shoulders on the terminal so that the terminal serves as a standoff to support a device such as a coil remote from a circuit board. The terminal preferably is provided with ridges and grooves. The ridges have sloping surfaces which guide a wire into the grooves during assembly of a wire to the terminal. The surfaces bordering the grooves are adapted for frictional locking engagement with the wire. The wire can be fused to the terminal by a solderless fusing process. The ridges protect the wire from damage by the fusing electrodes, and deformation of the ridges preferably serves to lock the wire into the grooves. Preferably, the wire-receiving grooves are formed in the widened connecting section.

18 Claims, 5 Drawing Sheets

ELECTRICAL TERMINALS, TERMINATING METHODS AND ASSEMBLIES

CROSS-REFERENCE TO RELATED APPLICATIONS

The present application is a continuation in part of U.S. Patent Application Ser. No. 808,530, filed Dec. 13, 1985, now U.S. Pat. No. 4,687,898, the disclosure of which is hereby incorporated by reference herein.

BACKGROUND OF THE INVENTION

The present invention relates to electrical terminals, methods of connecting an electrical wire to a terminal, electrical device assemblies and electrical device assembly methods.

Considerable difficulties have been encountered heretofore in making electrical circuit assemblies which include relatively fine wire leads. For example, wound wire coils typically incorporate a polymeric, plastic core and a fine wire, commonly referred to as "magnet wire," wound on the core. The wire normally has a coating of insulation. In manufacture of an electronic assembly including such a coil on a substrate such as a printed circuit board, an electrical connection must be established between the ends of the fine wire and metallic conductors on the circuit board. The coil must also be physically secured to the circuit board. Typically, the coil has been provided with a pair of elongated terminal pins. The pins are frictionally engaged in molded holes in the polymeric bobbin so that the pins extend transversely to the axis of the bobbin. The ends of the wire typically are wrapped around the pins and then soldered to the pins, as by immersing the pins in a solder bath. The pins are then positioned in holes in the circuit board, and soldered to the metallic lines on the circuit board as in a wave soldering operation.

Assembly procedures of this nature are costly and troublesome. The heat employed to solder the wires to the terminal pins and to solder the terminal pins to the circuit board may cause deformation of the polymeric bobbin and hence may cause loosening of the frictional engagement between the terminal pins and the bobbin. Also, the heat employed in soldering the terminal pins to the circuit board can cause melting of the solder at the wire to pin joints and hence may cause disconnection of the wire from the pins.

As set forth in the aforementioned U.S. Patent Application Ser. No. 808,530, the fine wires utilized in coils can be successfully fused to the terminal pins in a solderless fusing process. Each terminal pin is provided with notches or grooves sized to receive the wire and spaced along the length of the pin so that then the wire is wrapped onto the pin in a helical pattern, portions of the wire lie within the grooves. In one embodiment, the pins are substantially square in cross section, and the grooves extend across two opposed corners of the square cross section. Those portions of the wire which are received in the grooves are recessed relative to the outer surface of the pin. The pin is engaged with fusing electrodes so that the electrodes contact the pin in the vicinity of the grooves. Because the wire lodged within the grooves is recessed relative to the outer surface of the pin, the fusing electrodes do not contact the wire itself, but instead contact the pin. Ordinarily, two opposed electrodes contact each pin, and an electric current is passed between these electrodes through the pin, thereby heating the pin and wire to vaporize insulation from the wire and fuse the wire with the pin. Because the fusing electrodes contact the pin rather than the wire, a closed circuit is established between the electrodes even where the wire carries insulation. Moreover, the fusing electrodes cannot deform or sever the wire.

Terminal pins and fusing operations as described in the '530 application provide very significant improvements over the soldered wire to pin connections previously utilized Because the heat generated in the solderless fusing process is localized at the wire to pin junctures and typically is applied only for a brief moment, it does not tend to cause deformation of the bobbin. Moreover, the fused juncture between the wire and the pin will not be damaged by further heat applied in soldering the pin to the circuit board.

The teachings of the '530 application can also be applied in terminating leads from electronic and electrical devices other than coils, with similar advantages. Despite these advantages, even further improvement would be desirable.

SUMMARY OF THE INVENTION

One aspect of the present invention provides a terminal for an electrical device. The terminal may include an elongated metallic body defining a proximal to distal axis, and having a proximal shaft portion adjacent a proximal end of the body. The body preferably has a connection portion disposed distally of the proximal shaft portion. The connection portion has an exterior surface and a wire-receiving groove in the exterior surface. At least one dimension of the connection portion transverse to the proximal to distal axis of the body is greater than the corresponding dimension of the proximal shaft portion The connection portion preferably defines a proximal shoulder transverse to the axis at the distal end of the proximal shaft portion, i.e., at the juncture of the proximal shaft portion and the connection portion. Most preferably, the cross sectional area of the connection portion transverse to the axis of the body is greater than the cross sectional area of the proximal shaft portion.

A terminal according to this aspect of the present invention provides several distinct advantages vis-a-vis the pins of uniform cross section previously employed. The shoulder defined by the connection portion adjacent the proximal shaft portion can engage the electrical device and positively support the electrical device against movement along the axis of the connector. Most preferably, mounting means are provided for mounting the terminal to a support such as a printed circuit board These mounting means may include means for attaching the distal end of the connection portion to the circuit board. Thus, the terminal can serve as a standoff to support the electrical device away from the substrate or circuit board. For example, where the proximal shaft portion is engaged in a pin-receiving hole in a coil bobbin, and the distal end of the terminal is secured to the printed circuit board, the bobbin is supported away from the circuit board. Therefore, the bobbin will be less susceptible to heat applied to the circuit board, as during soldering operations. This support is achieved without any additional parts.

Moreover, because the cross sectional dimensions of the connection portion differ from those of the proximal shaft portion, the connection portion can have good physical strength even where substantial wire-receiving grooves are formed in the connection portion and even where those grooves are closely spaced. Typically, the cross sectional dimensions of those portions of the terminal intended to engage the bobbin or other electrical device body must be limited so as to fit within the relatively small holes provided in such bobbins or device bodies.

Various features can be provided for mounting the connection portion to the substrate or circuit board. In one embodiment, the terminal body is provided with a tab projecting transverse to the proximal-to-distal axis adjacent the distal end of the connection portion. In use, the tab is mounted to the surface of the substrate In another, particularly preferred arrangement, the terminal body includes a distal shaft portion projecting from the distal ed of the connection portion, the distal shaft portion pointing distally, away from the proximal shaft portion. Desirably, one or more cross sectional dimensions of the distal shaft portion are smaller than the corresponding dimension or dimensions of the connection portion, and the connection portion defines a distal-facing shoulder at the proximal end of the distal shaft portion, i.e., at the juncture of the distal shaft portion and the connecting portion. In assembly to a circuit board, the distal shaft portion may be engaged in a hole in the circuit board, and the distal facing shoulder may engage the surface of the circuit board. The distal and proximal shaft portions may have substantially the same dimensions. Thus, the proximal and distal ends of the terminal may be interchangeable, thereby eliminating any need for end-to-end orientation of the terminals during assembly operations and providing substantial economies in those operations.

A further aspect of the present invention provides a terminal with a plurality of ridges and one or more grooves extending alongside of and parallel to one another on the exterior surface of the terminal body. Each of the grooves lies between two of the ridges. Each ridge has an outer extremity projecting outwardly, away from the remainder of the terminal body and has a pair of side walls extending inwardly from the extremity of the ridge. The side walls of each ridge most preferably slope away from one another, and the sloping side walls of each ridge preferably define substantially the entire surface of the ridge. Each groove is bounded by the side walls of the ridges on either side of the groove. A wire engaging any of the ridges will be guided by the sloping side walls into one of the grooves. This feature dramatically simplifies the task of engaging the wire in the grooves, and results in a more reliable assembly process. Preferably, the sloping side walls bounding each groove are adapted to retain the wire in the groove by friction between the wire and the side walls. Thus, the angle included between the side walls bounding each groove preferably is selected to provide self-locking engagement with the wire. Frictional retention of the wires in the grooves further enhances reliability of the assembly process and prevents damage to the wire during the fusing operation. Because the wire will always be in the groove, it will always be recessed and hence protected from the fusing electrodes.

The ridges are relatively slender, at least at their outermost extremities. Therefore, the ridges can be deformed, after the wire is positioned in the grooves, so as to lock the wire into the grooves.

The terminal body may have two oppositely directed surfaces, and the grooves and ridges are provided on these oppositely-directed surfaces. Thus, the terminal body may include a flat, strip-like connection portion with oppositely-facing edge surfaces, and the grooves and ridges may be formed in these edge surfaces. Alternatively, the connection portion may be cylindrical, and the grooves and ridges may be provided on diametrically opposed, and hence oppositely facing, portions of the cylindrical surface. In this arrangement, the grooves and ridges may extend entirely around the cylindrical surface and may cooperatively form a continuous helical thread.

Further aspects of the present invention provide methods of terminating wires. In a method according to one such further aspect of the invention, the wire is juxtaposed with the alternating ridges and grooves of a terminal so that the wire extends generally parallel to the ridges and grooves and the wire is engaged in the grooves by moving the wire towards the terminal body. During this step, the wire is guided by the sloping walls of the ridges so that the wire will reliably engage in the grooves. The wire is then bonded to the terminal body, preferably by fusing.

Preferably, the wire is engaged with the grooves by winding the wire onto the terminal in a helical pattern. The terminating method preferably includes the step of deforming the ridges so as to lock the wire within the grooves, and the wire is preferably bonded to the terminal by fusing. The fusing operation may be is performed by engaging the terminal with fusing electrodes, such as a pair of opposed fusing electrodes, so that the fusing electrodes contact the terminal but do not contact the wire. Alternatively, the wire may protrude slightly beyond the extremities of the ridges and the electrodes may contact the protruding portions of the wire, so that the fusing current passes between electrodes by way of the wire and the terminal. The electrode may be heated to vaporize insulation from the wire so as to make good electrical contact.

Where one or both of the fusing electrodes contact the ridges on the terminal, the fusing electrodes may serve to deform the ridges. In this case, deformation of the ridges is facilitated by the heat created in the ridges during the fusing operation. In a particularly preferred arrangement, where grooves and ridges are provided on oppositely-directed faces of the terminal, the terminal is simply engaged between opposed fusing electrodes and pressure is applied simultaneously with electric potential as the fusing electrodes are brought into engagement with the ridges at opposed locations on the terminal.

Still further aspects of the present invention provide methods of assembling and interconnecting an electrical device to a substrate. These methods are particularly well suited to connecting coils with substrates such as printed circuit boards. In the preferred methods according to this further aspect of the present invention, a wire extending from the electrical device is fused to a terminal, the terminal is physically engaged with the body of an electronic device such as with the bobbin of a coil, and the terminal is physically engaged with the substrate and electrically interconnected to circuit components on the substrate. Thus, the terminal not only physically supports the device remote from the substrate but also electrically connects the device with the circuit elements of the substrate.

Still further aspects of the present invention include electrical assemblies comprising an electronic device, a terminal fused to a wire extending from the electronic device and a substrate, the terminal being physically engaged with the body and the substrate so that the terminal supports the device body remote from the substrate and also provides an electrical interconnection between the substrate and the wire. Desirably, the substrate is a printed circuit board. As will be appreciated, the particular terminals mentioned above are especially well suited for use in the last-mentioned assembly methods and assemblies.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
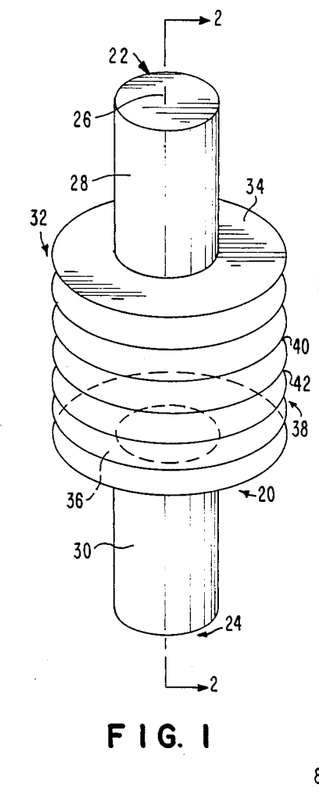
FIG. 1 is a schematic perspective view of a terminal according to one embodiment of the present invention.

A terminal 20 according to one embodiment of the present invention includes an elongated metallic body having a proximal end 22, a distal end 24 and a proximal to distal axis 26 extending in the long direction of the terminal body between these ends. The terminal body includes an elongated, cylindrical proximal shaft portion 28 adjacent proximal end 22, and an identical, elongated cylindrical distal shaft portion 30 adjacent distal end 24. The terminal body also includes a generally cylindrical connection portion 32 disposed between the proximal shaft portion 28 and the distal shaft portion 30. All of these cylindrical portions of the terminal body are concentric with one another and with proximal to distal axis 26. The major or outside diameter D of connection portion 32 is greater than the diameters d of proximal shaft portion 28 and distal shaft portion 30. The connection portion thus defines a first shoulder 34 facing towards the proximal end of the terminal at the distal end of proximal shaft portion 28, i.e., at the juncture between the proximal shaft portion and the connecting portion 32. Likewise, the connecting portion defines at its juncture with distal shaft portion 30 a second, distal-facing shoulder 36.

Figure 2:
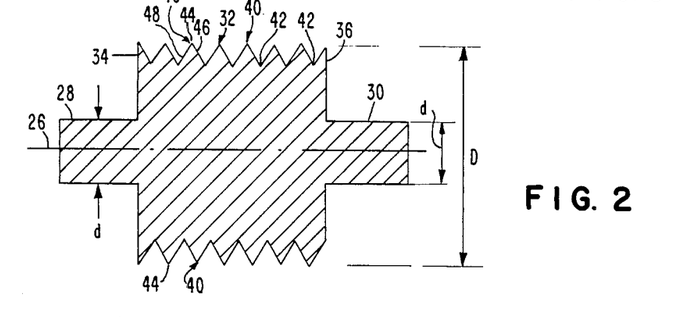
FIG. 2 is a sectional view taken along lines 2—2 in FIG. 1.

Connecting portion 32 is provided with a helical thread 38 extending over the exterior circumferential surface of the connecting portion. The helix of thread 38 is concentric with axis 26. Thread 38 defines a series of alternating ridges 40 and grooves 42 extending substantially parallel to one another around the circumference of connecting portion 32. As best appreciated with reference to FIG. 2, the ridges 40 and grooves 42 at diametrically opposed locations on the circumference of the connecting portion face in opposite directions. Each ridge 40 has an outermost extremity 44, remote from the remainder of the connecting portion. Each ridge also has a first sloping side wall 46 and a second sloping side wall 48, the side walls sloping away from one another in the inward direction, away from outermost extremity 44. As the ridges 40 and grooves 42 lie alongside one another, the side walls of the ridges also define the bounding walls of the grooves 42. Thus, the first side wall 46 of one ridge 40a (FIG. 3) and the second side wall 48 of another ridge 40b bound the groove 42 disposed between those ridges.

Figures 3, 4, 5, 6:
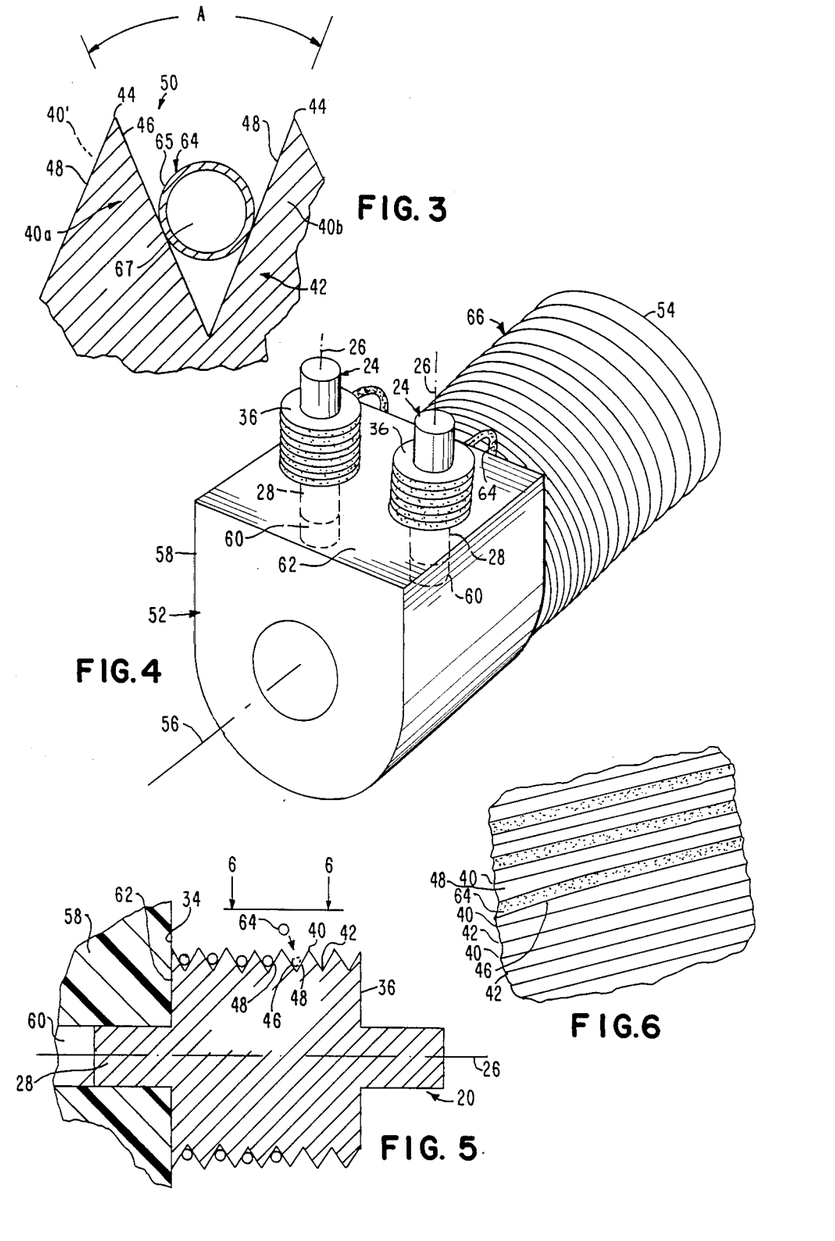
FIG. 3 is a fragmentary sectional view on an enlarged scale showing a portion of the terminal illustrated in FIGS. 1 and 2.
FIG. 4 is a schematic view of a magnetic coil subassembly incorporating two terminals each as illustrated in FIG. 1-3.
FIG. 5 is a schematic sectional view showing a portion of an assembly process according to one embodiment of the present invention.
FIG. 6 is a fragmentary view taken along lines 6—6 in FIG. 5.

The slopes of side walls 46 and 48 are selected so that the angle A between the opposed walls bounding each groove 42 is small enough to provide a self-locking frictional engagement with a round wire 64 engaged in the groove. Where a round wire is engaged in the groove, there will be a reaction force applied by the side wall surfaces normal to the side wall surface. This force will have a component directed outwardly, towards the opening 50 of the groove. These outward components will be equal to $(F)\sin(A)$ where F is the reaction force between the side wall and the wire normal to the side wall. The frictional forces directed inwardly along the wall surfaces away from the extremities 44 will have magnitude equal to $(U)(F)$ where U is the coefficient of friction between the wire and the wall surfaces. The inward component of these forces, in the direction directly away from opening 50 (towards the bottom in FIG. 3) will be equal to $(U)(F)\cos(A)$. Thus, where the system is just self locking, and the frictional forces exactly balance the outward component of the reaction forces:

$$(U)(F)\cos(A) = (F)\sin(A)$$

Therefore, for friction to hold the wire in the groove:

$$A = 2\tan^{-1}(U)$$

Smaller values of A will yield more positive self-locking action.

Terminals as described above can be used in fabrication of a magnetic coil subassembly as illustrated in FIG. 4. The coil incorporates a polymeric, typically thermoplastic bobbin 52 having a generally cylindrical body 54 defining a bobbin axis 56 and a flange 58 projecting from the cylindrical body 54. The flange 58 is provided with a pair of terminal receiving holes 60 extending transverse to bobbin axis 56. The proximal shaft portion 28 of each terminal 20 has a diameter suitable for frictional engagement in one of the holes 60. The proximal shaft portion 28 of each terminal 20 is press fit into one of the terminal receiving holes 60 until the proximal flange 34 of the terminal engages the surface 62 of flange 58 on bobbin 52. As seen in FIG. 5, engagement of shoulder 34 with surface 62 positively locks the bobbin against movement relative to each terminal 20 along the axis 26 of the terminal, towards the distal end 24 of the terminal. Also, with the terminals 20 engaged with the bobbin 52 in this fashion, the axis 26 of each terminal is transverse to the axis 56 of the bobbin, and the distal end 24 of each terminal 20 projects outwardly, away from bobbin axis 56. The distal shoulder 36 of each terminal thus faces away from the bobbin and away from axis 56.

A fine wire 64 is wound on the cylindrical body 54 of bobbin 52 so that wire 64 forms helical windings 66 on the body. Each end region of wire 64 is engaged with the grooves in the connection portion of one of the terminals 20 by wrapping the wire 64 around the connection portion. The wire is wrapped onto the connection portion of each terminal in a helical pattern generally corresponding to the helical pattern of the grooves and ridges. Thus, as the wire is wrapped onto the connection portion, the wire 64 will extend generally parallel to the ridges 42 and grooves 40. During the wrapping process, tension applied to the wire 64 will tend to pull the wire onto the terminal and hence will tend to pull the wire towards the grooves and ridges. As best appreciated with reference to FIGS. 5 and 6, it is not necessary to maintain precise parallelism between the wire 64 and the ridges 42 and grooves 40 as the wire is being applied to the terminal, and it is likewise unnecessary to maintain precise alignment of the wire with the grooves. The sloping surfaces 46 and 48 of the ridges 40 bounding each groove will tend to guide the wire into the groove as the wire approaches the surface of the terminal. Because the sloping surfaces 46 and 48 cover substantially the entirety of each ridge, the wire does not tend to catch at the extremities 44 of the ridges. Therefore, the wire can be readily engaged with the grooves. Once the wire is engaged with the grooves, friction will hold the wire temporarily in the grooves because of the self-locking action described above.

Figure 7:
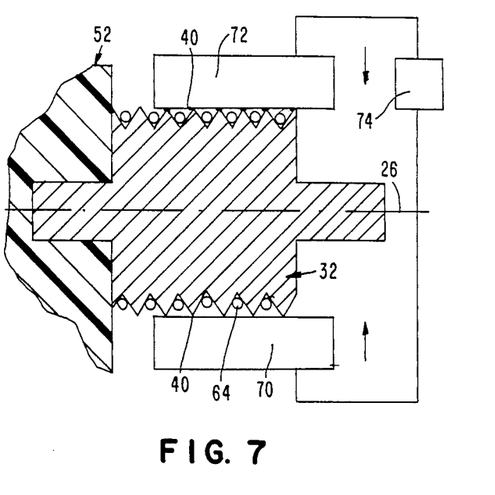
FIG. 7 is a schematic view similar to FIG. 5 but showing another step in the process.

After the wire has been engaged in the grooves, the wire is fused to both of the terminals 20 as illustrated in FIG. 7. Thus, each terminal is positioned between a pair of opposed metallic fusing electrodes 70 and 72. Preferably, both terminals in the assembly are positioned between the fusing electrodes simultaneously. Thus, fusing electrodes 70 and 72 may be elongated bar-like electrodes arranged to engage the connection portions 32 of both terminals 20 simultaneously. Electrodes 70 and 72 are forcibly moved towards one another by conventional apparatus, such as a fluid actuated press or the like. The direction of this movement preferably is parallel to bobbin axis 56 (FIG. 4). The fusing electrodes 70 and 72 encounter the ridges 44 at diametrically opposed locations on the connecting portion 32 of each terminal 20, thus establishing electrical continuity between the electrodes through the terminal itself. As the wire 64 is recessed within the grooves 42, and hence recessed relative to the surface defined by the outermost extremities of ridges 44, the electrodes bear on the ridges but do not bear directly on the wire 64.

As the electrodes encounter the ridges 40, an electrical potential is applied across the fusing electrodes by a conventional fusing power supply 74. Thus, current flows through the ridges and through the connecting portion 32 of the terminal, between the electrodes. This flowing current generates considerable heat at the ridges, and particularly at the points of contact between the extremities 44 of the ridges and the electrodes. This heat vaporizes the insulation 65 on those portions of the wire adjacent the electrodes, leaving only the metallic core 67 of the wire. The combined effects of heat and pressure cause the extremities 44 of the ridges to deform in the areas contacted by fusing electrodes 70 and 72. Thus, the ridges 40 are squashed by the fusing electrodes and assume shapes generally as indicated in broken lines at 40' in FIG. 3. These deformed regions of the ridges at least partially close the openings 50 of the grooves, thereby trapping the metallic core 67 of the wire within the grooves. Also, the metallic core 67 of the wire fuses with the material of the terminal under the combined influences of heat generated by the electric current and pressure applied to the wire through the deformed portions of the ridges. However, because the fusing electrodes do not directly contact the wire, the wire is effectively protected from damage or severance by the fusing electrodes.

Figure 8:
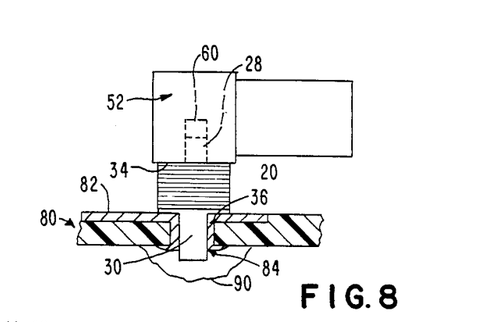
FIG. 8 is a fragmentary schematic sectional view of an assembly incorporating the coil of FIG. 4.

After the fusing operation, the resulting coil and terminal subassembly typically is installed in a larger electrical or electronic assembly. The assembly includes a substrate 80 in the form of a printed circuit board having electrical connecting elements or conductors 82 thereon. The circuit board has holes 84 extending through it. To attach the coil subassembly to the substrate, the distal shaft portions 30 of the terminals are inserted through holes 84 until the distal shoulder 36 of each terminal bears on the top surface of the circuit board. Thus, the distal end of each terminal body is secured to the circuit board. Because the distal shoulder 36 of each terminal bears on the circuit board, and the proximal shoulder 34 bears on the bobbin 52, the bobbin is effectively supported above the circuit board. Solder 90 is then applied to the circuit board, most typically by a wave-soldering technique, to form a metallurgical bond between the distal shaft portion 30 of each connector and the adjacent electrical conductor 82. During the wave soldering operation, considerable heat is applied to the circuit board and to the distal ends of the terminals 20 by the molten solder. However, because the bobbin is effectively supported remote from the circuit board by the terminals 20, the bobbin will not be damaged by heat applied to the circuit board. Specifically, the frictional engagement between the proximal shaft portions 28 of the terminals and the terminal holes 60 in the bobbins will not loosened by heat. This effective isolation of the bobbin from the circuit board during the soldering operation is provided without any additional components or manipulative steps.

Figures 9, 10:
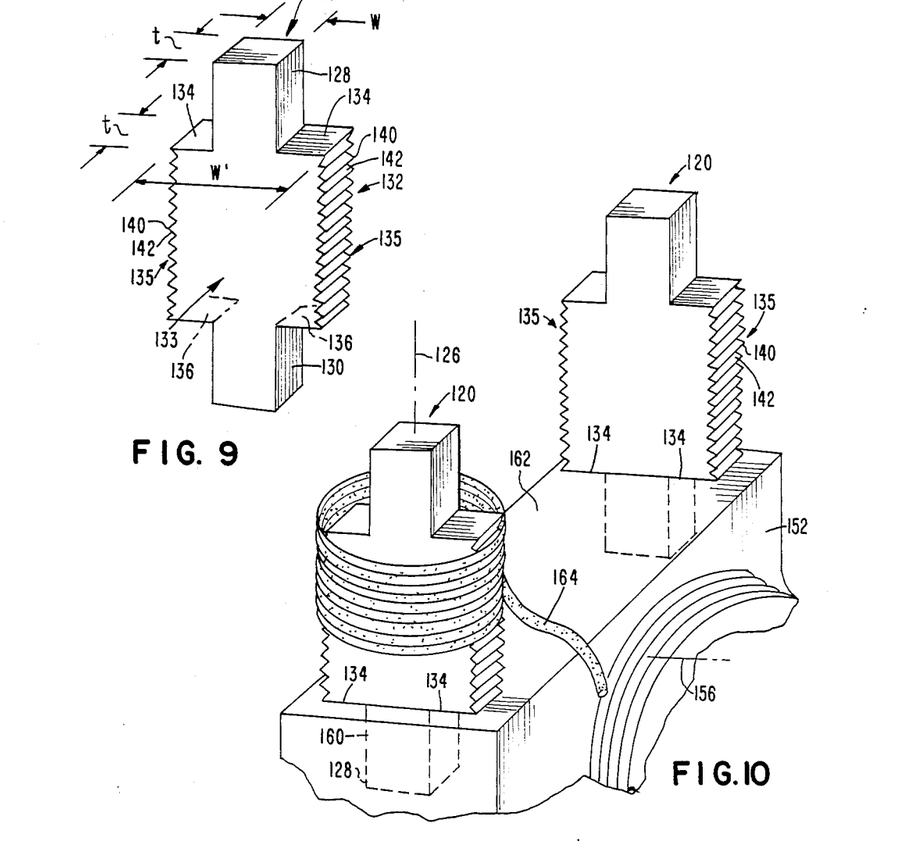
FIG. 9 is a schematic perspective view of a terminal according to a further embodiment of the present invention.
FIG. 10 is a schematic perspective view of a step in an assembly process according to a further embodiment of the present invention, utilizing the terminal of FIG. 9.

A terminal 120 according to a further embodiment of the present invention as shown in FIG. 9, is formed from a flat, thin plate or strip of metal. The terminal of FIG. 9 has a proximal shaft portion 128 and a substantially identical shaft portion 130, both of which are square in cross section and hence have a width w equal to the thickness t of the plate or strip. The connecting portion 132 has the same thickness t but a considerably greater width W'. Thus, the connecting portion 132 has a pair of relatively wide oppositely directed faces 133 and a pair of relatively narrow oppositely directed edges 135 extending from face to face. Because the connecting portion 132 is of greater width than the shaft portions 128 and 130, it defines proximal facing shoulders 134 at its juncture with proximal shaft portion 128 and distal facing shoulders 136 at is juncture with distal shaft portion 130.

The connection portion 132 is provided with ridges 140 and grooves 144 extending parallel to one another along each of the narrow edges in the thickness direction of the body, i.e., between the faces 133. The wide faces 133 of the connecting portion are devoid of grooves and ridges. As will be appreciated, the great width W of the connecting portion provides ample room for grooves of sufficient depth to accommodate the wire without unduly weakening the terminal body. The profile of the grooves and ridges is similar to that depicted in FIG. 3. Thus, each of the ridges 144 has sloping, straight side walls which encompass substantially the entire ridge and which meet one another at the outermost extremity of the ridge.

Terminals as illustrated in FIG. 9 can be utilized in substantially the same way as the terminals described above with reference to FIGS. 1-8. As shown in FIG. 10, two of the terminals 120 as illustrated in FIG. 9 may be engaged with a coil bobbin 152 having square terminal-receiving holes 160, the proximal shaft portion 128 of each such terminal being engaged in one of the terminal-receiving hole 160 and the proximal facing shoulders 134 of each terminal bearing on the surface 162 of the bobbin body. As illustrated in FIG. 10, the terminals preferably are oriented so that the narrow edges 135 of each connecting portion, and hence the ridges 140 and grooves 142 of each terminal, face in directions parallel to the bobbin axis 156 of the coil bobbin. The wire 164 is engaged in the grooves 140 of each terminal by wrapping the wire around the connecting portion 132 of the terminal in a helical pattern, the axis of the helix being coincident with the longitudinal axis 126 of the terminal. Thus, those portions of the wire crossing the narrow faces 135 of the terminal will extend generally parallel to the grooves and ridges on those faces.

As with the connectors described above with reference to FIGS. 1-8, the sloping surfaces of the ridges provide a guiding action, and it is therefore unnecessary to maintain either exact registration or exact parallelism of the wire and grooves when the wire is initially applied to the terminal. The wire will automatically be aligned with the grooves when it engaged the side walls of the ridges. Just as in the system described above, the side walls bounding each groove provide self-locking frictional engagement of the wire in the groove. Therefore, after the wire is engaged in the grooves, it will remain there. The fusing operation is substantially the same as described above. Thus, after the wire has been positioned in the grooves, the terminals 120 are engaged between a pair of opposed fusing electrodes (not shown) so that the narrow faces 135 confront the fusing electrodes. The fusing electrodes are brought towards one another and supplied with an electrical potential so as to vaporize the insulation on wire 164, deform the extremities of the ridges 142 and bond the metallic core of the wire to the terminal.

Figure 11:
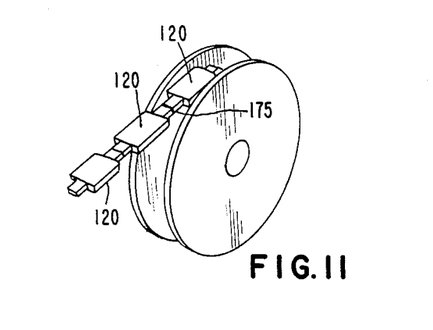
FIG. 11 is a schematic perspective view of a package containing a multiplicity of terminals as illustrated in FIG. 9.

Terminals as illustrated in FIGS. 9 and 10 can be supplied in reels as shown in FIG. 11, or in other continuous forms. Thus, the terminals may be formed from a continuous metallic strip, so that a plurality of terminals 120 are attached end to end, with weakening score lines 175 or other relatively weak connections therebetween. The terminals may be severed from one another at the time of use. This materially simplifies material handling and feeding operations during assembly. Moreover, because the terminal is substantially end-to-end symmetrical, and because the shaft portions 128 and 130 are of substantially the same dimensions, the proximal and distal ends of the terminal can be interchanged in use. It is unnecessary to maintain end-for-end orientation of the terminals during the assembly operations.

Figure 12:
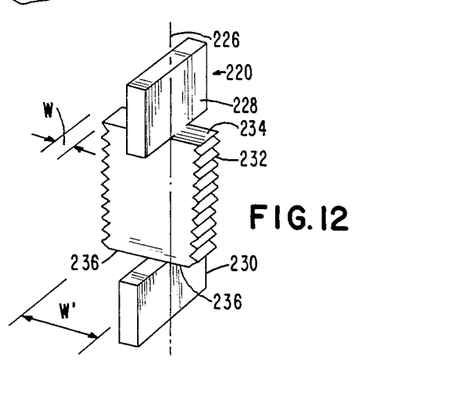
FIG. 12 is a schematic perspective view showing a terminal according to a further embodiment of the present invention.

The terminal 220 of FIG. 12 is generally similar to the terminal of FIGS. 9-11. However, in terminal 220, the connecting portion 232 has the same cross sectional area as the shaft portions 228 and 230. The flat connecting portion 230 is rotated, about the proximal to distal axis 226 of the terminal, relative to the flat shaft portions 228 and 230. Thus, the widthwise dimension W' of connecting portion 232 is greater than the corresponding dimension w of the shaft portions (the dimension in the same, widthwise direction). The connection portion 232, therefore, defines proximal facing shoulders 234 and distal facing shoulders 236. This terminal, accordingly will support a coil bobbin or other electrical device remote from the substrate in substantially the same way as the other terminals described above. However, this terminal is less preferred inasmuch as the device must have a hole of sufficient size to accommodate the large proximal shaft portion 228.

Figure 13:
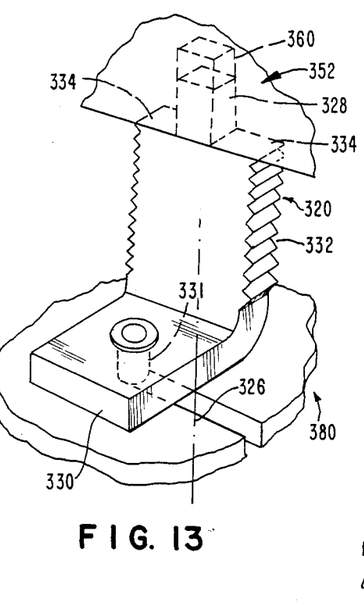
FIG. 13 is a schematic view of an assembly incorporating a terminal according to yet another embodiment of the present invention.

The terminal 320 illustrated in FIG. 13 is also generally similar to the terminal of FIGS. 9-11. Thus, the terminal incorporates a proximal shaft portion 328 and a connecting portion 332 of greater cross sectional area than proximal shaft portion 328 defining proximal facing shoulders 334 at the juncture of the proximal shaft portion 328 and connection portion 332. However, terminal 320 does not employ a distal shaft portion for engagement with the substrate or printed circuit board. Instead, a tab 330 projects transversely to the connecting portion 332 and transversely to the axis 26 of the terminal at the distal end of the connecting portion. The tab is provided with a hole 331 extending through it, so that the tab can be riveted to a substrate. This terminal also will support the electrical device or coil body 352 remote from the substrate or circuit board 380 when the proximal shaft portion is engaged in a hole 360 in the device body or coil bobbin 352. The wire is fastened and fused to this terminal in substantially the same way as described above.

Figure 14:
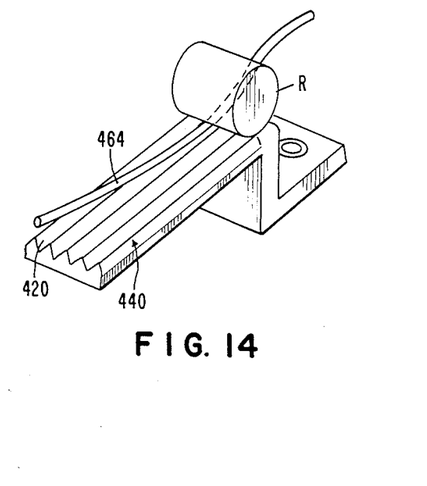
FIG. 14 is a schematic perspective view showing a terminal and a portion of an assembly process according to further embodiments of the present invention.

The terminal illustrated in FIG. 14 differs from the terminals described above in that the terminal of FIG. 14 is not intended to serve as a standoff or device support as well as a terminal. Therefore, the features used to attach the proximal end of the terminal to the device body are omitted. Also, the terminal 420 of FIG. 14 has ridges 440 and grooves 420 on only one surface. A wire 464 can be engaged with these grooves and ridges by disposing the wire generally parallel to the grooves and ridges and pressing the wire downwardly, onto the grooved surface of the terminal, as by a roller R, without wrapping the wire around the terminal in a helical configuration. However, the basic guiding and wireretaining action of the grooves and ridges is the same as described above. Thus, so long as the wire is initially oriented generally parallel to the grooves and ridges, the sloping guide surfaces of the ridges will guide the wire into one of the grooves as the wire is pressed towards the grooves and ridges. Also, the self-locking frictional engagement of the groove walls with the wire will retain the wire in the groove. The fusion bonding operation is also substantially similar to that described above. Thus, a fusing electrode (not shown) is forcibly advanced against the ridges 440, while another fusing electrode is contacted with the terminal body remote from the ridges. The fusing electrode tends to deform the ridge extremities, while the heat generated by electric current passing through the terminal between the electrode vaporizes the insulation and bonds the metallic core of the wire to the metal of the terminal body. As will be appreciated, the groove and ridge arrangements shown in any of the figures can be employed as a part of substantially any terminal where a wire must be attached. Therefore, these arrangements can be combined with terminals having features such as bayonet locks, clips or the like for connecting the terminal, and hence the wire bonded thereto, to other electrical devices.

Figure 15:
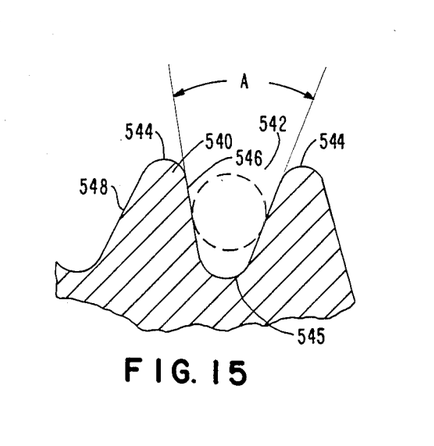
FIGS. 15 and 16 are further fragmentary schematic sectional views each similar to FIG. 3 and illustrating terminals according to further embodiments of the present invention.

In the embodiments described above, the sloping side walls of the individual ridges define straight lines when seen in a sectional view taken along a cutting plane transverse to the ridges and grooves (as, for example as seen in FIG. 3). By contrast, in the terminal of FIG. 15, the side walls 546 and 548 are not straight when seen in section. Instead, the side walls 546 and 548 of the individual ridges 540 define generally sinusoidal curves when seen in section taken along a cutting plane transverse to the direction of the ridges and grooves. However, the basic guiding action is still the same, inasmuch as the sloping, curved surfaces extend substantially over the entirety of each ridge and serve to guide the wire into the adjacent groove 542. The angle A between opposed, curved sloping guide surfaces may be taken as the angle between straight lines tangent to the sloping, curved surfaces at points of tangency midway between the outermost extremities 544 of the ridges and the innermost extremity or root 545 of the groove. Curved surfaces as illustrated in FIG. 15 tend to provide even a smoother guiding action than the straight guide surfaces discussed above with reference to FIGS. 1–14. Thus, because the outermost extremities 544 of the ridges are rounded or radiused, they do not tend to dig into the material of the wire as the wire passes over them. As will be appreciated, these rounded or curved surface ridges can be applied in conjunction with any of the embodiments discussed above.

Figure 16:
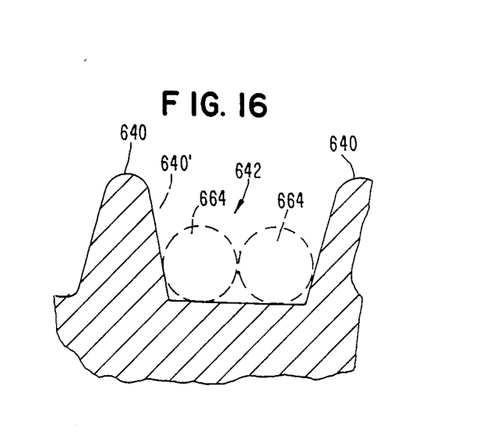

As illustrated in FIG. 16, the grooves 642 may be made wide enough to accommodate two wire portions 664 side by side within each groove. Thus, where the grooves extend in a helical pattern or in a pattern such as that of FIGS. 9 and 10 compatible with helical winding, two turns of wire can be wound into each groove. The guiding action of the sloping surfaces on the ridges 640 is generally similar to that described above. Also, in fusing, the extremities of the ridges deform as indicated in broken lines at 640', which tends to lock the wires into the groove as described above.

Figure 17:
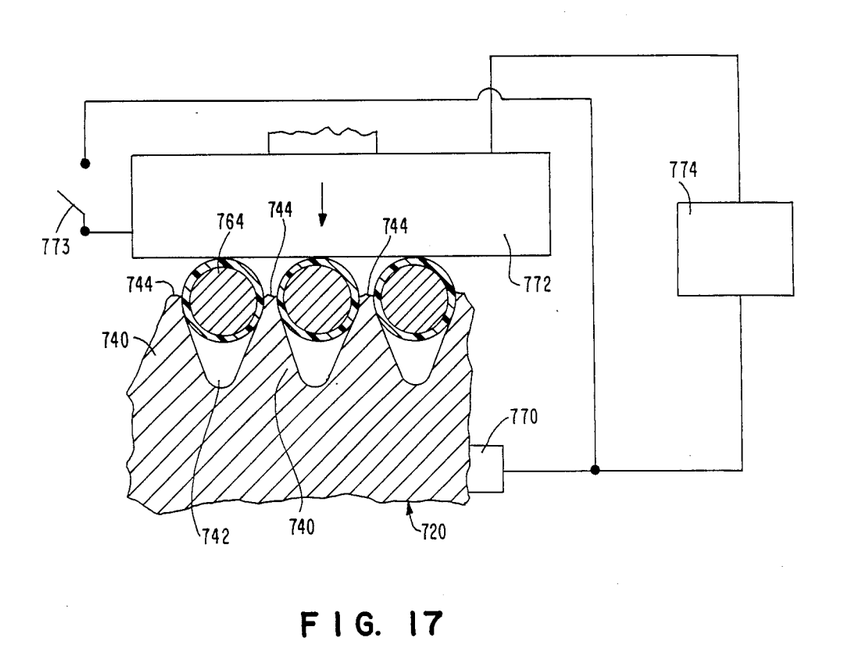
FIG. 17 is yet another fragmentary sectional view showing a step in an assembly process according to yet another embodiment of the invention.

In the fusing method schematically shown in FIG. 17, the grooves 742 of the terminal 720 are slightly smaller, relative to the wire than in the embodiments discussed above. Those portions of wire 764 engaged in grooves 742 are only partially recessed into the outermost surface of the terminal as defined by the extremities 744 of ridges 740. Thus, each portion of wire 764 protrudes outwardly beyond the extremities 744 of the adjacent ridges. With the wire so engaged in the grooves, electrodes 70 and 72 are brought into engagement with the terminal and the wire. Electrode 72 does not initially contact the terminal directly but instead contacts the protruding portions of wire 764. As wire 764 is insulated, this initial contact does not immediately establish electrical continuity between the electrodes To establish contact, electrode 772 is momentarily heated as by temporarily closing switch 773 so as to direct electrical current from fusing current source 774 through a closed circuit which does not include terminal 720 or wire 764. Electrode 772 is continually urged toward terminal 720 during this process, so that the hot electrode remains physically engaged with wire 764. Accordingly, heat from the electrode vaporizes insulation from the wire. When the insulation has been stripped from the appropriate portions of the wire in this fashion, switch 773 is opened. Electrode 772 makes contact with metallic core of wire 764 and, through the core of the wire with the surfaces of terminal 720. At this point a fusing current passes from electrode 772, through wire 764 and through terminal 720 to the opposite electrode 770. The wire is thus fused to the terminal period. The force applied to electrode 772 continues to force the wire 764 inwardly, into grooves 742. Depending upon the relative sizes of the wire core and the grooves, the electrode 772 may push the wires into the grooves until the electrode contacts the extremities 744 of the ridges. At this point the fusing action continues in a process similar to those described above, with the fusing current passing directly from electrode to electrode via the terminal, and also with some deformation of the ridge extremities so as to lock the wire into the grooves.

As will be appreciated, this embodiment of the invention entails some contact between the fusing electrodes and the wire. Nonetheless, the relatively fine wire is protected by the grooves from damage during the fusing operation. Although the wire may be deformed somewhat in its cross section by contact with the electrode 772, the wire nonetheless cannot be severed by the forces applied through the electrode. Instead, the wire will be forced into the groove and may be formed into the cross sectional shape of the groove. As will be appreciated, FIG. 17 is a schematic view. Thus, although electrode 770 is depicted as directly contacting a portion of terminal 720, it should be appreciated that this electrode as well can be arranged to contact the protruding portions of the wire, in a fashion generally similar to the action electrode 772.

The terminals described above can be manufactured from substantially any material compatible with the fusing process. Where the terminal is to be utilized in a soldering process, the material should also be wettable by the solder. Tinned brass offers good performance in many applications. Other metallic materials can also be employed As will be readily appreciated, numerous variations and combinations of the features described above can be utilized without departing from the present invention as defined in the claims. Accordingly, the foregoing description of the preferred embodiments should be understood as illustrating, rather than as limiting, the invention as defined in the claims.

What is claimed is:

1. A method of terminating a wire comprising the steps of:
   (a) providing a terminal having a plurality of ridges and one or more grooves extending substantially parallel to the alongside one another so that each said groove lies between two of said ridges on a surface of the terminal, each said ridge having an outermost extremity and oppositely-facing side walls extending away from said extremity and sloping away from one another;
   (b) engaging the wire in at least one of said grooves by juxtaposing the wire with said grooves and ridges so that the wire extends generally parallel to said grooves and ridges and moving the wire towards the grooves and ridges so that said sloping side walls of said ridges guide the wire into said grooves; and
   (c) bonding the wire to the terminal with the wire disposed in the grooves.

2. A method as claimed in claim 1 wherein said terminal is provided with said grooves and ridges arranged along oppositely-directed faces of the terminal and said engaging step includes the step of winding said wire onto the terminal in a helical pattern.

3. A method as claimed in claim 1 wherein said bonding step includes the step of deforming the outermost extremities of said ridges so that the deformed extremities lock said wire in said grooves.

4. A method as claimed in claim 1 wherein said bonding step includes the step of fusing said wire to said terminal by contacting said terminal with a pair of electrodes so that said electrodes do not contact the portions of said wire disposed in said grooves and passing an electric current between said electrodes through said terminal.

5. A method as claimed in claim 4 wherein said step of engaging said electrodes with said terminal include the step of engaging at least one of said electrodes with said ridges.

6. A method as claimed in claim 5 wherein said step of engaging said electrodes with said terminal includes the step of forcing said at least one electrode onto said ridges during said step of passing electric current between said electrodes so that the extremities of said ridges are deformed under the combined influence of forces applied by said at least one electrode and heat generated by said electric current.

7. A method as claimed in claim 2 wherein said step of engaging the wire in at least one of said grooves is performed so that a portion of the wire engaged in each groove protrudes outwardly beyond the outermost extremities of the adjacent ridges, and wherein said bonding step includes the step of preliminarily contacting a pair of electrodes with said terminal and said wire so that at least one of said electrodes engages the protruding portions of said wire, and directing an electric current through said electrodes, said wire and said terminal.

8. A method as claimed in claim 7 wherein said wire is an insulated wire and bonding step further comprises the steps of heating said at least one of said electrodes and transmitting heat from said at least one electrode to said wire to thereby vaporize insulation from said protruding portion of said wire.

9. A method as claimed in claim 8 wherein said bonding step includes the step of forcing said at least one electrode towards said terminal during said preliminary contacting step and then forcibly contacting said at least one electrode with said ridges so that the extremities of said ridges are deformed under the combined influence of forces applied by said at least one electrode and heat generated by said electric current.

10. A method as claimed in claim 1 wherein said terminal is provided with said grooves and ridges arranged along oppositely-directed faces of the terminal, said engaging step including the step of winding said wire about said terminal in a helix, said bonding step including the steps of placing said terminal between a pair of opposed electrodes so that said oppositely-directed faces confront said opposed electrodes and moving said electrodes towards one another.

11. A method as claimed in claim 1 wherein said engaging step includes the step of frictionally engaging said wire with said side walls of said ridges so that said side walls retain said wire in said one or more grooves.

12. A method as claimed in claim 4 wherein said wire is an insulated wire.

13. A method as claimed in claim 1 wherein said wire is a wire extending from an electrical device, the method further comprising the step of physically fastening said terminal to said electrical device.

14. A method as claimed in claim 13 wherein said electrical device is a coil comprising a bobbin and a plurality of turns of said wire on said bobbin, said step of physically fastening including the step of fastening said terminal to said bobbin.

15. A method of mounting and connecting an electrical device having a body and a fine wire extending from the body comprising the steps of:
   (a) providing a terminal having proximal and distal ends, a proximal shaft portion at the proximal end, a connecting portion distal to the proximal shaft portion and a proximal shoulder projecting transverse to said proximal shaft portion and its juncture with the connecting portion, the connecting portion having at least one groove therein;
   (b) physically engaging the proximal shaft portion in a hole in the device so that said proximal shoulder bears on the device and the distal end of the connecting portion is remote from the device;
   (c) engaging a wire extending from the device in said groove and fusing the wire to said connecting portion; and
   (d) fastening the distal end of said terminal to said substrate so that said connecting portion supports said device remote from said substrate and electrically interconnects said device with said substrate.

16. A method as claimed in claim 15 wherein said substrate is a circuit board, said step of fastening said distal end of said connecting portion including the step of soldering the distal end of said terminal to said circuit board.

17. A method as claimed in claim 16 wherein said terminal has a distal shaft portion projecting from the distal end of said connecting portion and a distal shoulder at the proximal end of said distal shaft portion, said step of fastening said terminal to said substrate including the step of inserting said distal shaft portion into a hole in said circuit board so that said distal shoulder bears on a top surface of said circuit board.

18. A method as claimed in claim 16 wherein said electrical device is an electromagnetic coil having a polymeric bobbin, said step of physically engaging said proximal shaft portion including the step of engaging said proximal shaft portion in a hole in said polymeric bobbin.

* * * * *